June 10, 1969   H. S. HOFFMAN, JR., ET AL   3,449,576
COMPENSATED PATH LENGTH POLARIZED LIGHT DEFLECTOR-SELECTOR
Filed July 2, 1965

INVENTORS
HARRY S. HOFFMAN, JR.
JAMES LIPP

BY *Earl C. Hancock*
ATTORNEY

United States Patent Office 3,449,576
Patented June 10, 1969

3,449,576
COMPENSATED PATH LENGTH POLARIZED LIGHT DEFLECTOR-SELECTOR
Harry S. Hoffman, Jr., Saugerties, and James Lipp, Kingston, N.Y., assignors to International Business Machines Corporation, Armonk, N.Y., a corporation of New York
Filed July 2, 1965, Ser. No. 469,068
Int. Cl. G02f *1/24;* G02b *5/30, 27/28*
U.S. Cl. 350—157                    9 Claims

ABSTRACT OF THE DISCLOSURE

A compensated optical light beam deflection device. Self-compensation of light paths of different wavelengths of radiation is achieved by the unique configuration of birefringent material in conjunction with an isotropic medium. A beam consisting of two orthogonal polarizations is deflected so as to separate the two polarizations into independent beams.

---

Figure 1:
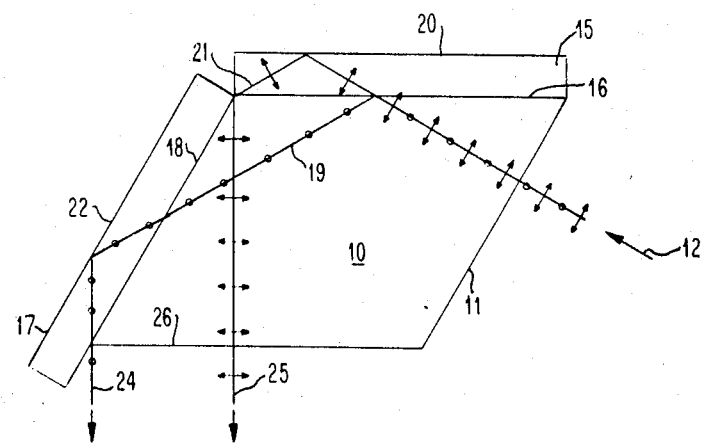

This invention relates to optical devices for selecting or separating light rays or beams on the basis of polarization thereof. More particularly, this invention relates to devices for segregating light generated from a common source where the light is either of a first polarization or of a polarization orthogonal with respect thereto, these being sometimes referred to as the ordinary and extraordinary rays or beams.

There are devices in existence which can cause rotation of a polarized light beam passing therethrough. Such devices are particularly useful for rotating a polarized beam orthogonally since this can be controlled by electronic circuitry and permits the diversion or switching of the resultant beam so produced. Such a device is discussed in more detail in the article entitled "A Fast, Digital-Indexed Light Deflector" by W. Kulcke et al. at page 64 in the IBM Journal of Research and Development, volume 8, No. 1, January 1964 issue. This article also discusses some possible arrangements of birefringent materials for accomplishing beam diversion. The prior art polarized beam diversion devices have not realized uniformity of length for the various paths which a light beam might follow through the device. Thus, if the beam is sharply focused for one output from a prior art switching or diverting device, it is out of focus for another output. Further, significant separation of the output beams is generally accomplished in the prior art only with considerable difficulty.

Accordingly, the present invention utilizes optical principles and concepts in a relatively simple structural configuration to provide electro-optic light beam deflection. The various light paths through a device constructed in accordance with the present invention are self-compensated so as to be substantially equal even for different wave lengths of radiation which may be caused to propagate through the system. The invention utilizes a minimum of birefringent materials to permit large separation or over-lapping of the ordinary and extraordinary light beams at the exit from a particular stage.

It is a characteristic of birefringent materials that they exhibit a high index of refraction to light beams of one polarity impinging thereon and a low index of refraction to light of a polarity oriented 90° with respect to the first polarity. This characteristic is advantageously utilized by the present invention to realize separation and, at least in one embodiment, this characteristic is also utilized to provide the path length compensation.

Briefly, the present invention employs isotropic materials for receiving an input beam that is polarized in either a first direction or in a second direction generally orthogonal with respect to the first direction. The light so received is incident to a surface within the isotropic material which is arranged to reflect light of one polarization back into the isotropic material and to pass therethrough light of orthogonal polarization. Birefringent material is arranged with respect to the aforementioned surface for accepting the light passed therethrough and reflecting that light back through the surface into the isotropic material. The isotropic material then contains a second surface for receiving and reflecting to an output either or both of the beams from the first surface whether reflected by the first surface or by the birefringent material. This second surface is arranged to reflect both light beams in a manner that provides path length compensation. The compensating arrangement in one embodiment is an extension of the isotropic material at the second surface to cause the beam reflected by the first surface to travel a distance sufficient to compensate for the extra distance travelled by the light reflected in the birefringent material. In another embodiment, the compensating arrangement is additional birefringent material arranged with respect to the second surface to reflect the light reflected by the first birefringent material and accept the light reflected at the first surface, this latter light being reflected back into the isotropic material parallel to the light reflected at the second surface. Preferably, the entire assembly would be enclosed in a medium or material which will reflect back into the device any light attempting to escape therefrom except where such light is to provide an output.

Accordingly, it is an object of this invention to provide a polarized light separator having path length compensation for the light so separated.

It is another object of this invention to advantageously employ the characteristics of birefringent and isotropic materials to accomplish separation of polarized light.

It is yet another object of the present invention to provide segregation of polarized light based upon the orientation of the polarization.

It is a still further object of the present invention to provide switching of a light beam from a common source to a selected output appearance in a manner that is readily adaptable to control by electronic circuitry.

Another object of this invention is to permit separation of light from a common source with the output light being totally separated or partially over-lapped.

Figure 2:
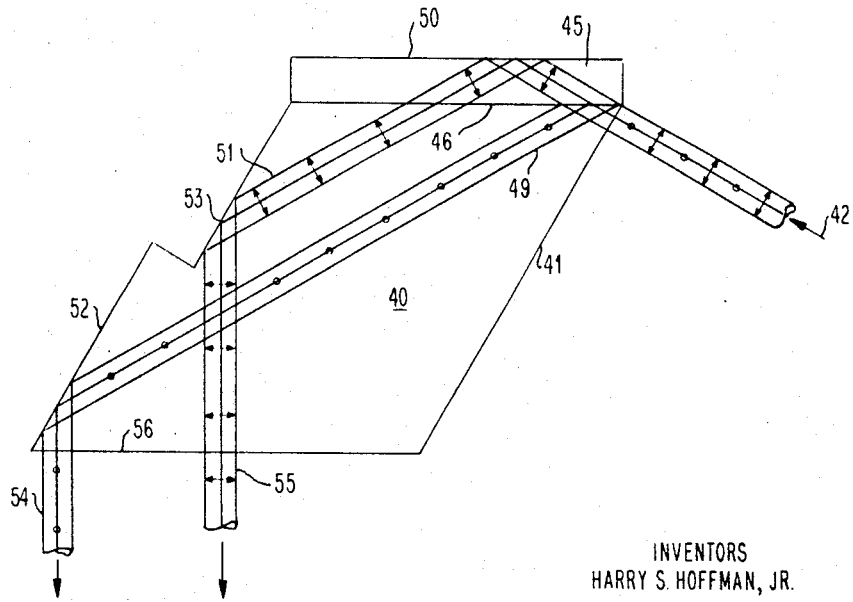

The foregoing and other objects, features and advantages of the present invention will be apparent from the following more particular description of preferred embodiments of the invention as illustrated in the accompanying drawing in which:

FIGURE 1 is a polarized light separator in accordance with the present invention utilizing two plates of birefringent material, and FIGURE 2 is another embodiment of this invention wherein path length compensation is accomplished by an extension of the isotropic material.

Light originating from an external source would be polarized and could be passed through a rotator or electro-optic switch such as the KDP crystal rotator shown by Kulcke et al. in the IBM Journal article mentioned hereinbefore before being introduced to the apparatus of this invention. In the drawings, rays shown with circular dots represent one polarization while the rays with polarization orthogonal with respect to the dot rays are shown with double headed arrows normal to the direction of propagation.

The FIG. 1 embodiment is shown with a basic block of isotropic material 10 having an index of refraction N1.

Light from a source is propagated towards incident surface 11 from source 12 and can be polarized as indicated by the dots (i.e., perpendicular or in and out of the plane of the drawing) or by the double headed arrows or both. In the FIG. 1 example, a plate of birefringent material 15 is placed adjacent to surface 16 of isotropic block 10 with the optic axis of plate or crystal 15 being either normal to the plane of the drawing or in the plane of the drawing and perpendicular to the incident ray from 12. A second crystal or plate of birefringent material 17 is placed adjacent to surface 18 of block 10 with its optic axis opposite that of plate 15. For instance, if the optic axis of plate 15 is normal to the drawing, then the optic axis of plate 17 is in the plane of the drawing perpendicular to incident ray 19 and vice versa.

As mentioned, it is a characteristic of birefringent material that it will exhibit a high index of refraction to polarized light having one orientation and a low index of refraction to polarized light having on orientation orthogonal or displaced by 90° with respect to the first mentioned orientation. In the FIG 1 device, the high index of birefringent plates 15 and 17 is chosen at least approximately equal to the index of refraction of isotropic block 10, this index being designated N1. The lower index for plates 15 and 17 will be designated N2.

Thus by using orthogonally oriented polarizations of light from source 12, one parallel and one perpendicular to the plane containing both the incident ray and optic axis and with a normal incidence on the input face 11, complete selection can be made. Rays of one polarization will encounter the high index N1 and, having an angle of incidence greater than critical, will be totally reflected at the interface or surface 16 as shown at 19 since birefringent plate 15 will exhibit its lower index of refraction N2 to this ray. The orthogonally oriented ray will experience the higher index of refraction N1 upon arrival at surface 16, and, since this index approximately equals the index of the block 10, will pass into plate 15 to be reflected at the far surface 20 thereof back into block 10 as is shown at 21.

It should be noted that preferably at least the surface 20 of plate 15 and surface 22 of plate 17 would be surrounded by some medium composed of a material having a refractive index equal to or lower than the lowest index, N2, of birefringent plates 15 and 17. The medium should be selected to provide total internal reflection at surfaces 20 and 22 and could be air, a vacuum, oil, a coating, deposition, growth, liquid immersion or the like.

Since the optic axis of plate 17 is opposite that of plate 15 as mentioned hereinbefore, reflected ray 19 will pass through surface 18, be reflected at surface 22 and appear as an output beam at 24. However, ray 21 which had been reflected at surface 20 will encounter the low index N2 of plate 17 and, having an angle of incidence greater than critical, will be totally reflected from surface 18 so as to provide an output beam at 25. By controlling the thickness of plates 15 and 17, so as to be substantially the same, the path length travelled by the two polarized beams from incident surface 11 to output surface 26 can be kept substantially identical.

The thickness ($h$) of plates 15 and 17, the effective distance ($2a$) between surface 16 and surface 26, angle ($x$) between exit ray 25 and surface 18 and the separation ($d$) between exit rays 24 and 25 can be interrelated as follows:

$$2a = \frac{d}{\operatorname{Tan} x}$$

$$h = \frac{d}{4 \operatorname{Cos} x}$$

FIGURE 2 reveals another arrangement in accordance with the present invention but wherein the ray separation and path length compensation are accomplished by use of a single birefringent plate. In this configuration, block 40 is constructed of isotropic material and incident surface 41 receives polarized light from source 42. Plate 45 is of birefringent material and at surface or interface 46, for reasons similar to those discussed for FIG. 1, causes one polarization of light to be totally reflected at 49. The other polarization passes into plate 45. Surface 50 of plate 45 has a medium surrounding it with an index of refraction proper for totally reflecting the beam passing into plate 45 back through surface 46 into block 40. The beam 51 so reflected next encounters surface 53. Surfaces 52 and 53 are also surrounded by a medium having a proper index of refraction to cause total internal reflection thereat, this medium generally being the same medium as surrounds surface 50. In any event, surface 52 is extended beyond surface 53 for receiving reflected beam 49 and totally reflecting it as output beam 54 so that both output beams will have travelled substantially the same distance from incident surface 41. Thus only one focus adjustment need be made for either output beam.

It should be noted that the totally reflecting surfaces such as 16, 18, 20 and 22 of FIG. 1 or 46, 50, 52 and 53 of FIG. 2 could be provided by suspending appropriate plates in an isotropic medium such as oil, air or the like without actually fabricating a block such as 10 or 40. Such a construction could be further simplified by simply employing a low index coating at surfaces 20 and 22 in FIG. 1 or 50, 52 and 53 of FIG. 2. If a solid block is utilized, then glass, clear plastic or the like could be employed while solid birefringent plates could be constructed of natural calcite, sodium nitrate or any material available to those having normal skill in the art. The birefringent plates could be formed by a thin film of birefringent material at surfaces 16 and 18 in FIG. 1 or 46 in FIG. 2 with the distance between these plates and surfaces 20 and 22 or 50, respectively, being filled with the same isotropic material that substantially matches the higher index of refraction of the birefringent material. In addition to the general insensitivity of the present invention to wave length variations, the device automatically corrects for refraction distortion. This is realized as long as the incident angle of the input beam it is the same as the angle of the output beams at the exit. As a beam separator, the present invention makes it possible to produce discrete output beams with relatively short optic path lengths. This provides a large numeric aperture with a relatively small actual aperture and conservative use of materials allowing minimum volumes for the required size of deflectors. The geometry of parallel plates and/or layers or coatings are additional features permitting practical manufacture, inspection and alignment. Additionally, the present invention permits ecapsulation of the hygroscopic birefringent medium away from a hostile environment.

It should be noted that the term "reflection" as used herein generally means total internal reflection although wherever applicable, ordinary mirror reflection should be recognized as an alternative. Although the preferred embodiments have been described as light beam separators, it should be understood that the device could be operated in reverse for joining light beams at a common output and still be within the intended spirit of this invention.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A polarized light deflector comprising
a source for selectively producing polarized light,
birefringent material,
an isotropic material having a light source input surface through which said source of polarized light is introduced into said isotropic material, said isotropic material having a first surface defined in contact with said birefringent material for reflecting the light received from said source when of a first polarity and for passing therethrough said light when polarized orthogonally with respect to said first polarization, said isotropic material having a second reflective surface, said birefringent material being arranged for accepting said light passed through the said first reflective surface and for reflecting the said light so accepted back through said first reflective surface, said second reflective surface being arranged for receiving light reflected both by said first reflective surface and by said birefringent material, said second reflective surface reflects the light received thereby into paths of substantially equal lengths with respect to said source.

2. Apparatus in accordance with claim 1 which includes means for preventing escape of light from said birefringent material except back into said isotropic material and for preventing escape of light from said second reflective surface.

3. An apparatus in accordance with claim 2 wherein said birefringent material and said second reflective surface provides overlap of the separated light reflected from said second reflective surface.

4. An apparatus in accordance with claim 2 wherein said birefringent material is a thin coating and which further includes material having an index of refraction substantially matching the higher index of refraction of said birefringent material, said matching material communicating with the side of said birefringent material opposite said first surface so as to define a plate therewith.

5. A polarized light deflector comprising
an isotropic material having first and second pairs of parallel surfaces defined thereon, said first pair being sloped with respect to the said second pair and intersecting said second pair so as to substantially define a parallelogram cross-section therebetween, one surface of said first pair defines a light source input surface through which said polarized light beam is introduced into said isotropic material, source means for selectably introducing a polarized light beam normal to said one surface of said first pair, a plate of birefringent material adjoining the surface of one of said second pair of surfaces which defines an acute angle with the said one surface of said first pair, the high index of refraction of said birefringent material being substantially equal to the index of refraction of said isotropic material, said source means being oriented so that one polarization of the light beam therefrom will be totally reflected from the surface of said isotropic material adjoined by said plate whereas the orthogonally polarized light therefrom will be passed by that said surface, a medium surrounding said isotropic material and said plate, said medium having an index of refraction not greater than the lowest index of refraction of said birefringent material for totally reflecting light beam from said source which enters said birefringent material from said isotropic material, and means associated with the other surface of said first pair for providing path length compensation for light originating from said source means and reflected by said isotropic material and said birefringent material.

6. Apparatus in accordance with claim 5 wherein said compensating means is a second plate of birefringent material of the same thickness and characteristics as the first mentioned said birefringent plate, said second plate having an optic axis parallel to the said isotropic material surface associated therewith but oriented for accepting light reflected by the said surface of said isotropic material adjoined by the first said birefringent plate.

7. Apparatus in accordance with claim 5 wherein said compensating means is a plate of said isotropic material having substantially the same thickness as said birefringent plate and being associated with only the portion of said other surface of said first pair which is illuminated by said light reflected from said surface of said second pair pair associated with said birefringent plate.

8. Apparatus in accordance with claim 5 wherein the thickness of said birefringent plate and said path length compensation means provides overlap of the separated light reflected by said other surface of said first pair.

9. Apparatus in accordance with claim 5 wherein said plate of birefringent material comprises
a coating of birefringent material adjoining the said surface of said second pair, and
the remainder of said plate being composed of a material having an index of refraction substantially equal to the higher index of said birefringent material.

References Cited

UNITED STATES PATENTS

| | | | |
|---|---|---|---|
| 2,447,828 | 8/1948 | West | 350—157 |
| 2,449,287 | 9/1948 | Flood | 350—152 |

FOREIGN PATENTS

Fleisher, "Digital Indexed Angular Light Deflector System" IBM Technical Disclosure Bulletin, Vol. 6, No. 5, October 1963 pp. 32–34.

DAVID SCHONBERG, *Primary Examiner.*

P. R. MILLER, *Assistant Examiner.*

U.S. Cl. X.R.

350—147, 152, 169